United States Patent [19]

Kitamura

[11] Patent Number: 4,517,579
[45] Date of Patent: May 14, 1985

[54] ELECTROSTATIC RECORDING APPARATUS FORMING SMALL NON-RECORDING REGIONS IN A RECORDING FIELD

[75] Inventor: Takashi Kitamura, Yokohama, Japan

[73] Assignee: Canon Kabushiki Kaisha, Tokyo, Japan

[21] Appl. No.: 550,057

[22] Filed: Nov. 8, 1983

Related U.S. Application Data

[63] Continuation of Ser. No. 186,583, Sep. 12, 1980, abandoned.

[30] Foreign Application Priority Data

Sep. 20, 1979 [JP] Japan .............................. 54-121500
Nov. 30, 1979 [JP] Japan .............................. 54-155309
Dec. 26, 1979 [JP] Japan .............................. 54-169563

[51] Int. Cl.³ ............................................ G01D 15/14
[52] U.S. Cl. .................................... 346/160; 346/108; 358/298

[58] Field of Search ....................... 346/108, 158, 160; 355/3 R; 358/298–300

[56] References Cited

U.S. PATENT DOCUMENTS 4,052,715 10/1977 Steifer .............................. 358/300 X Primary Examiner—Thomas H. Tarcza
Attorney, Agent, or Firm—Fitzpatrick, Cella, Harper & Scinto

[57] ABSTRACT

Electrostatic recording apparatus forming small non-recording regions in a recording field includes a beam generator generating a beam modulated with a modulation signal, an irradiating unit directing the beam to a photosensitive member to form an electrostatic image, a determination circuit determining when the electrostatic image formed by the beam on the photosensitive member exceeds a predetermined size, an interruptor for intermittently interrupting the emission of the beam at small time intervals, and an actuating circuit actuating the interruptor when the determination circuit determines when the electrostatic image exceeds the size.

20 Claims, 18 Drawing Figures

A  BD SIGNAL
B  IMAGE WRITE-IN
C  UNBLANKING

A BD SIGNAL
B IMAGE WRITE-IN
C IMAGE SIGNAL TRANSFER

A ADDRESSING
B MEMORY 31 SELECTION
C MEMORY WRITE-IN INSTRUCTION
D IMAGE SIGNAL TRANSMIT INSTRUCTION
E IMAGE SIGNAL (PARALLEL)

ELECTROSTATIC RECORDING APPARATUS FORMING SMALL NON-RECORDING REGIONS IN A RECORDING FIELD

This application is a continuation of application Ser. No. 186,583 filed Sept. 12, 1980, now abandoned.

BACKGROUND OF THE INVENTION

1. Field of the Invention

The present invention relates to an electrostatic recording apparatus cabable of forming small non-recording regions in a recording field.

2. Description of the Prior Art

In an electrostatographic process, the distributions of the electrostatic charges and the electric field generally assume the state as shown in FIG. 1. In the case of depositing toner on the positive charges formed on an electrostatic image bearing layer a provided on a supporting electrode b, a small charged area A is developed as a solid black image portion while a large charged area B is developed heavily only in the peripheral portions thereof, which is well known as so-called "edge effect".

Such image development is suitable for the recording of line images, but is unadequate for recording the image involving large solid areas. However such edge effect in a large solid area can be reduced by constituting such a large area by dots or small regions as shown in FIG. 2.

SUMMARY OF THE INVENTION

An object of the present invention is therefore to provide an electrostatic recording apparatus capable of preventing deterioration of image quality resulting from the edge effect.

Another object of the present invention is to provide an electrostatic recording apparatus capable of selecting portions of an image which cause deterioration of image quality in the recorded image and improving the image quality in such portions.

Still another object of the present invention is to provide an electrostatic recording apparatus capable of improving image quality in the recording apparatus utilizing a laser beam.

Still another object of the present invention is to provide an electrostatic recording apparatus capable of improving image quality by employing a laser beam in the recording apparatus of the type in which an image is formed by irradiating a photosensitive member with an original image.

DESCRIPTION OF THE PREFERRED EMBODIMENTS

Now the present invention will be clarified more in detail by the description of the embodiment thereof.

Figure 3:
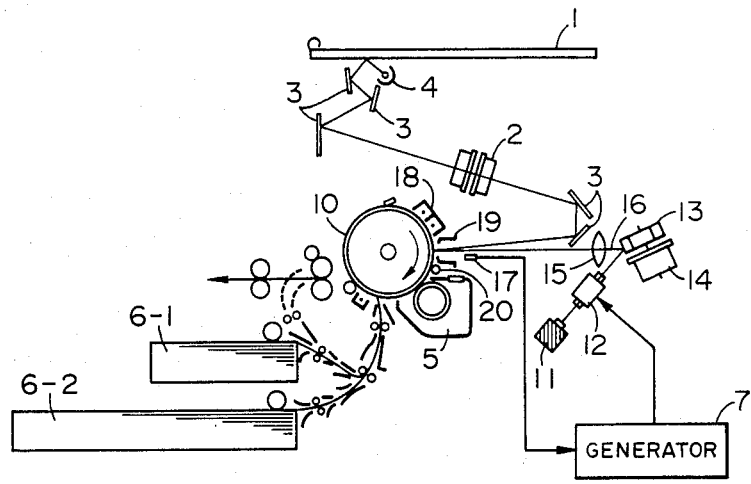
FIGS. 3 and 4 are a cross-sectional view and a perspective view, respectively, of an electrostatic recording apparatus embodying the present invention.
Figure 4:
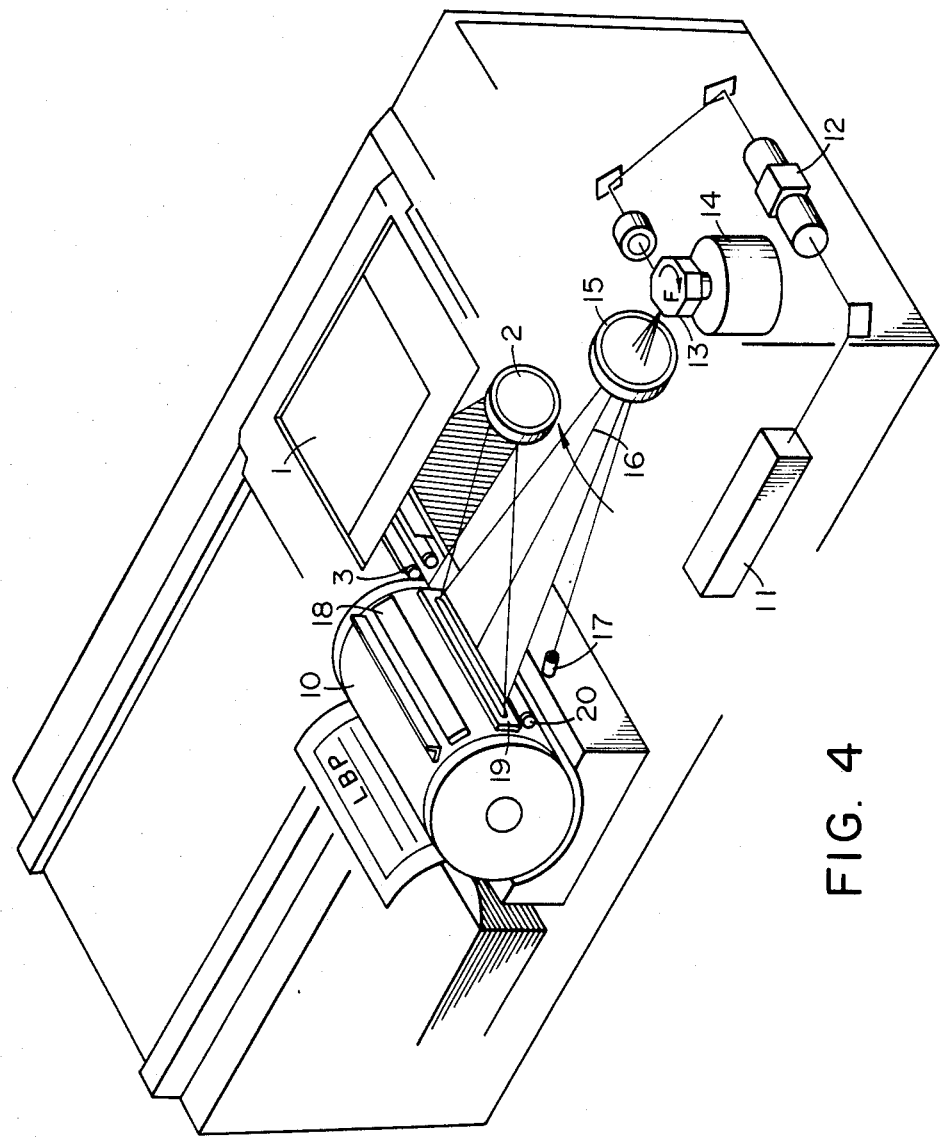

Reference is at first made to FIGS. 3 and 4 showing, respectively in a cross-sectional view and a perspective view, apparatus embodying the present invention, which is capable of performing combined functions as of a copier or duplicator (hereinafter called the copier mode) and of a laser beam printer (hereinafter called the LBP mode).

The copy mode section is composed of an original document 1, an imaging lens 2, a mirror 3 and an illuminating system 4, wherein an image of an original 1 illuminated by the illuminating system 4 is projected through the mirror 3 and the imaging lens 2 on a photosensitive drum 10. In the copy mode the apparatus is used singly as an ordinary document copier.

In the LBP mode, a laser beam generated by a laser unit 11 is introduced into the entrance aperture of a modulator 12 which may be composed of an acousto-optical deflecting-modulating device utilizing a known acousto-optical effect or of an electro-optical device utilizing a known electro-optical effect, wherein the laser beam is subjected to an intensity modulation according to the input signal to modulator 12.

Modulator 12 may be omitted in case the laser unit is composed of a semiconductor laser or of a internally modulated gas laser allowing current modulation or having a modulating device in the oscillating light path.

Such a laser beam from the laser unit is introduced, after passing a suitable optical system, into an beam expander (not shown), which expands the diameter of the laser beam with its parallelness maintained. The laser beam with its diameter thus expanded is then introduced into a polygonal rotary mirror 13 having plural mirror faces. Polygonal rotary mirror 13 is fixed on a shaft supported by a high precision bearing, such as an air bearing, and is rotated in a direction of arrow F by a constant-speed motor 14, such as a hysteresis synchronous motor or a DC servo motor, to cause the scanning motion of the laser beam in a direction substantially parallel to the rotary axis of the drum. Such scanning may also be achieved by means of a galvano mirror.

The laser beam put into horizontal scanning motion by means of polygonal rotary mirror 13 is focused, by an imaging lens 15 having the f-θ characteristic, which will be discussed below, as a spot on the photosensitive drum 10.

In an ordinary imaging lens, the focus position r on the image plane is related with the incident angle $\theta$ by the following relationship:

$$r = f \tan \theta \tag{1}$$

wherein f is the focal length of the imaging lens. On the other hand, in the present embodiment, the incident angle of the laser beam reflected by the rotary mirror 13 of a constant rotating speed with respect to the imaging lens 15 varies with time according to a linear function. Consequently the moving speed of the spot focused across the photosensitive drum 10 constituting the image plane is not constant but changes non-linearly, becoming larger at the point where the incident angle becomes larger. Consequently a series of spots formed by the laser beam pulses of a determined time interval will appear more dispersed in the lateral end portions than in the central portion of the photosensitive drum 10. In order to prevent such a phenomenon the imaging lens 15 is so designed as to have the following relationship:

$$r = f \cdot \theta \tag{2}$$

and such a lens is called an f-$\theta$ lens.

In the case of focusing a parallel beam with an imaging lens, the minimum spot diameter $d_{min}$ is given by:

$$d_{min} = f \lambda / A \tag{3}$$

wherein f is the focal length of the imaging lens, $\lambda$ is the wavelength of the light and A is the entrance aperture of the imaging lens, so that a smaller spot diameter will be obtained by increasing the value of A for given values of f and $\lambda$.

The aforementioned beam expander is employed in consideration of this fact, and may therefore be omitted with in case a desired value of $d_{min}$ is already obtained with the beam diameter from the laser unit.

A beam detector 17, composed of a small entrance slit and a rapid-responding photoelectric transducer, such as a PIN diode, is provided for detecting the position of the laser beam 16 during the scanning motion and thus determinning the timing for starting the input signals to the modulator 12 for providing desired optical information to the photosensitive drum. In this manner it is rendered possible to reduce the effects resulting from the errors in the precision of mirror faces of the rotary mirror 13 and in the horizontal synchronization of input signals, thus achieving an improved image quality and permitting a larger precision tolerance in and thus a cheaper manufacture of the polygonal rotary mirror 13 and the motor 14.

In the above-explained manner the photosensitive drum 10 is exposed to the laser beam 16 modulated with the input signals.

Now there will be explained how the printed image is obtained. A photosensitive member 10 essentially composed of a electroconductive substrate, a photoconductive layer and an insulative layer is charged, on the surface of the insulating layer, negatively and uniformly with a corona discharger 18 for the initial charging. Successively, the insulating layer, thus charged negatively and uniformly, is subjected to image exposure with the laser beam, and is substantially simultaneously subjected to positive recharging by a corona discharger 19 or to charge elimination by an AC corona discharger. Subsequently the insulating layer is entirely exposed to a lamp 20 to form a surface potential difference, thus creating an electrostatic image on the photosensitive member.

The electrostatic image is rendered visible in a developing unit 5 by toner deposition, wherein developing unit 5 and the toner are so designed and selected as to cause such toner deposition not in the regions exposed to the light or light beam but in the regions not exposed to such light or beam.

The toner image thus formed on the photosensitive drum 10 is transferred onto a recording sheet supplied from a cassette 6-1 or 6-2 and subsequently fixed on the sheet by heating or by applying pressure in a fixing unit (not shown).

The aforementioned copy mode and LBP mode may be conducted independently, but these two modes can be combined to alleviate the deterioration of the image quality observed in case the copy mode is conducted alone.

Such combination is achieved by forming the image of the original 1 on the photosensitive drum 10 through the imaging lens 2 and simultaneously irradiating the drum with a laser beam modulated with clock pulses of a determined frequency.

Figure 5:
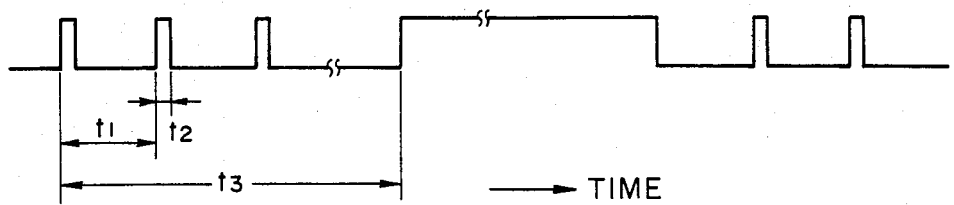
FIG. 5 shows a waveform of the laser modulating signal.
Figure 6:
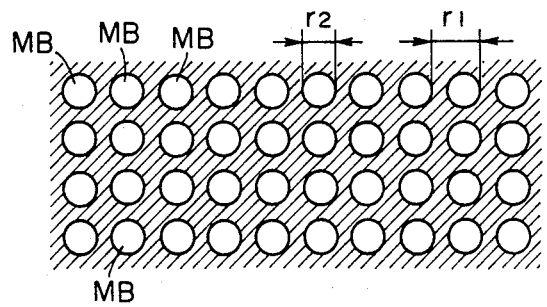
FIG. 6 is a plan view of an electrostatic image formed on the photosensitive drum.

More specifically a generator 7 generates a modulation signal, having a repetition period t1 and a duration t2 as shown in FIG. 5, of a predetermined frequency (for example 4 MHz) synchronized with the beam detection by the beam detector 17, and the laser unit receives the modulation signal for modulation in such a manner that the laser beam 16 is emitted only during the pulse durations t2. In this manner the photosensitive drum receives, in the case of a solid black original, no light therefrom but receives the laser beam modulated with the modulation signal as shown by MB in FIG. 6 to provide, after image development, a screen-like pattern by the toner deposition only in the hatched portions in FIG. 6. On the other hand, in the case of a solid white original, the photosensitive drum receives the light reflected from the original over the entire surface. Although the photosensitive drum receives the modulated laser beam also in this case, the exposure state of the drum is not affected thereby since it is already exposed to the light from the original. In this manner the exposed area gives a white image in the ordinary developing process. The spatial frequency r1 of dots and the width r2 thereof are determined in the manner described in the following.

Figure 7:
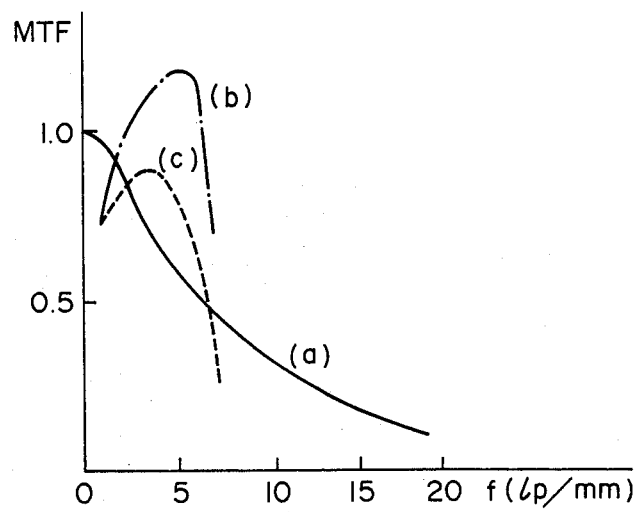
FIG. 7 is a graph showing the MTF plots of an electrostatic image formed on the photosensitive drum.

FIG. 7 shows a modulation transfer function (MTF) curve of an electrophotographic image in the copy mode, for example obtainable in a copy mode described in the Japanese Patent Publication 23910/1967, giving the modulation transfer in the ordinate as a function of the spatial frequency in the abscissa, wherein the curves (a), (b) and (c) respectively show the modulation transfer functions of latent image formation, image development and transfer, and entire image reproduction from latent image formation to final image output. As will be understood from FIG. 7 the steps of image development and transfer give rise to the eminent edge effect peaked at a spatial frequency of 5-6 lp/mm, and this fact contributes to the image quality in the copier.

Namely in the ordinary document copying involving principally images in the form of, the clear and sharp reproductions are obtained because of this fact.

Consequently a sufficiently high image density is obtained even in the solid black original if the spatial frequency of the screen dots is selected in the range of 5–6 lp/mm.

On the other hand the resolving power in the visual observation of an obtained copy will be lowered if the white regions formed of the screen dots are sufficiently resolved by the human eyes. For this reason the dimension r2 of the white regions is so selected preferably as to satisfy a condition r2<<r1. As will be understood from the curve (a) in FIG. 7, the modulation transfer function of the latent image extends to a considerably high spatial frequency.

Figure 1:
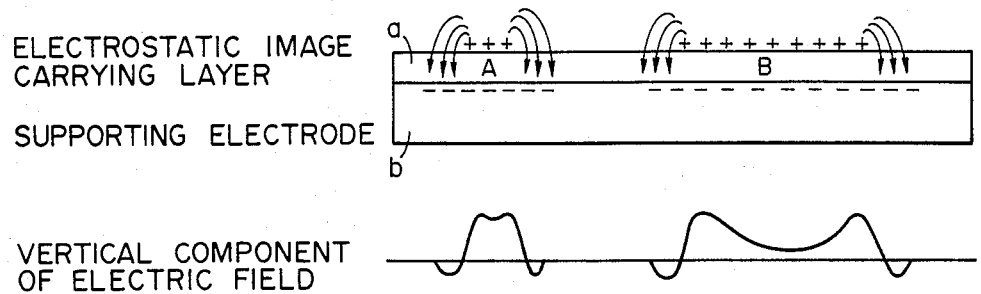
FIGS. 1 and 2 are schematic views showing the distributions of the electrostatic charges and the electric field on the photosensitive member.
Figure 2:
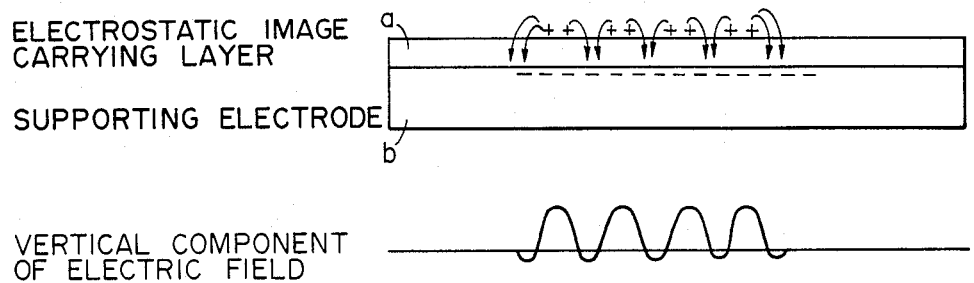

Consequently an electrostatic latent image has satisfactorily resolvable white dots of a sufficiently small dimension though with a somewhat deteriorated response, whereby the state of electric field becomes close to that shown in FIG. 2. Such white dots are not resolved in the image development and transfer steps so that no disagreeable impression is given to the human eyes by the presence of such screen dots. From the foregoing consideration it is desirable to adopt the conditions r2<<r1 and f1≈5–6 lp/mm, wherein f1=1/r1.

It is thus possible, in the above-explained manner, to reduce the presence of undeveloped regions in the reproduced image resulting from the edge effect. However such process is preferably applied selectively to the images containing continuous tone, such as photographs, since the screen dots overlaid on the line images, such as characters, will inevitably cause slight deterioration of the image quality.

In contrast to the foregoing embodiment in which the screen dots are employed in the recording of an original image, there will be explained in the following the use of screen dots in the recording in the copy mode or LBP mode alone.

Figure 8:
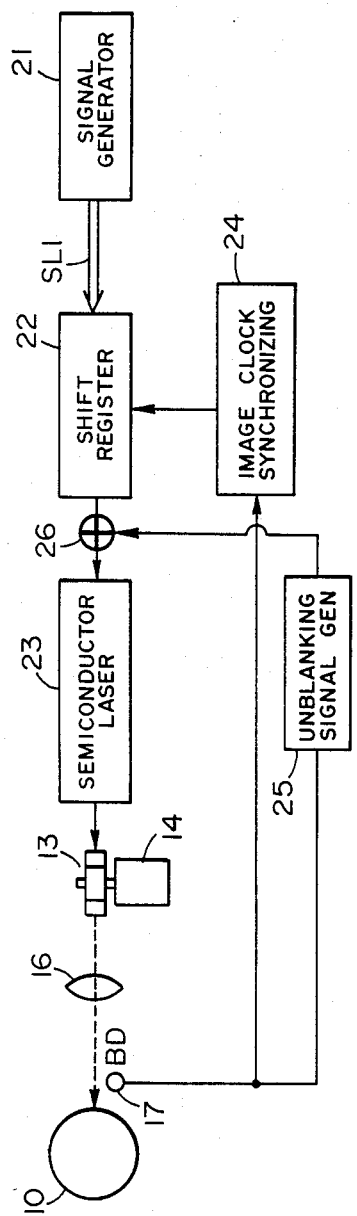
FIG. 8 is a schematic block diagram of the control circuitry for laser recording.

Reference is now made to FIG. 8 showing the recording control for a laser beam printer, in which a signal generator 21 generates image signals, for example in the form of a dot matrix, or array, character pattern, as parallel signals in response to the readout signals supplied from a memory contained in signal generator 21. Thus, in case a character is for example composed of n×m dots arranged in n dots in each line and in m dots in each column, there will be simultaneously produced n pixel signals in a parallel manner over signal lines SLI, corresponding to a line in the dot matrix.

The pixel signals are stored in a shift register 22 and supplied therefrom as serial image signals to drive a semiconductor laser 23, thereby causing the emission of a laser beam modulated according to the image signals. The laser beam is deflected by a scanner 13 and is focused by a lens 16 onto the photosensitive drum 10.

Photosensitive drum 10 is naturally provided on the periphery thereof with a member for electrostatic image formation as explained in relation to FIG. 3. Different from the foregoing embodiment, the toner deposition in the present embodiment is designed to take place in the regions exposed to the light. However it is also possible to cause toner deposition in the regions not exposed to light by suitable selection of the signals and the developing unit.

Thus, in case the shift register 22 stores n bits of logical "1" signals as an example, the semiconductor laser 23 receives the logical "1" signals until the completion of the readout of the n-bit signals from the shift register, thus continuously emitting the laser beam during the readout.

In order to synchronize the image signals with the laser beam for scanning the drum 10, the beam detector 17 detects the beam position immediately before the start of scanning motion of the laser beam on the drum 10 and generates a detection signal BD which is supplied as a trigger signal to an image clock synchronizing circuit 24 to control the timing of image transfer clock pulses supplied to shift register 22. Shift register 22 is thus shifted in response to clock pulses to obtain an image on the drum 10 in synchronism with signal BD, as shown in FIG. 9B.

For the purpose of the beam detection by the beam detector 17, the semiconductor laser 23 has to be activated to emit the laser beam prior to the start of scanning motion.

Figure 9:
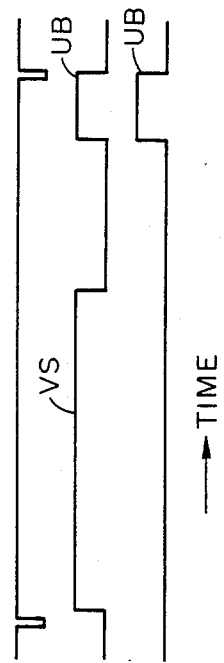
FIG. 9 shows waveforms of various signals in the control circuit shown in FIG. 8.

The laser beam emission from the semiconductor laser 23 in synchronism with the detection signal from beam detector 17 is achieved by an unblanking signal generator 25, which produces an unblanking signal at a determined time after the beam detection signal and terminates the unblanking signal as shown in FIG. 9C.

The unblanking signal and the aforementioned image signals are added in an adding circuit 26, of which addition output signals are used for controlling laser 23.

In such a laser beam printer a large solid image region is converted into a group of dots by a modulation suitably interrupting the serial image signals.

Such conversion however is not adequate in case the large solid image regions are mixed with line images since the line images can be reproduced more sharply with the edge effect and becomes deteriorated by the staggered line structure if the image signals are interrupted.

Consequently it becomes necessary to distinguish the large image regions from the small image regions before conducting the signal interruption as explained above.

Another difficulty lies in the fact that, even in large image regions, the edge portions thereof are already developable sufficiently and will therefore show disagreeable staggered edges if the dot structure is adopted in such portions. Thus the interruption of the image signals as explained above should be effected after an internal portion of an image region is distinguished from edge portions thereof, since such interruption is only needed in such an internal portion.

Figure 10:
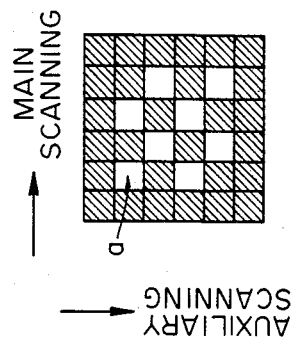
FIG. 10 is a plan view showing an exemplary image formed according to the present invention.

The above-mentioned difficulties are avoided in accordance with the present embodiment by identifying the shape and size of the image area and modulating the image signals according to the result of such identification. FIG. 10 illustrates an example of the image obtained according to the present embodiment, wherein a square large-sized image region composed of 6×6 pixels to be reproduced in black is given white pixels in a staggered manner in the non-edge portion, whereby the hatched parts in FIG. 10 are reproduced in black while the other parts remain in white.

The identification of non-edge pixels in a large image regions during the recording operation on the laser beam printer is to be achieved by the inspection of surrounding pixels. For example the identification of the pixel a in FIG. 10 is achieved by the inspection of the already recorded pixels and those to be recorded. For this purposes there are provided three line memories, respectively for a line already recorded, a line currently under recording and a line to be recorded next.

Based on these three line memories, it is possible to identify that a pixel to be recorded has to be white if all the nine pixels, i.e. that pixel and the surrounding pixels, are black. However, in order to obtain a staggered arrangement of such white pixels, each white pixels has to have immediately neighboring black pixels in the vertical and horizontal direction. For this reason it is necessary to effect a masking operation with such a signal as having a period of two pixels and inverting the phase in the neighboring lines.

Figure 11:
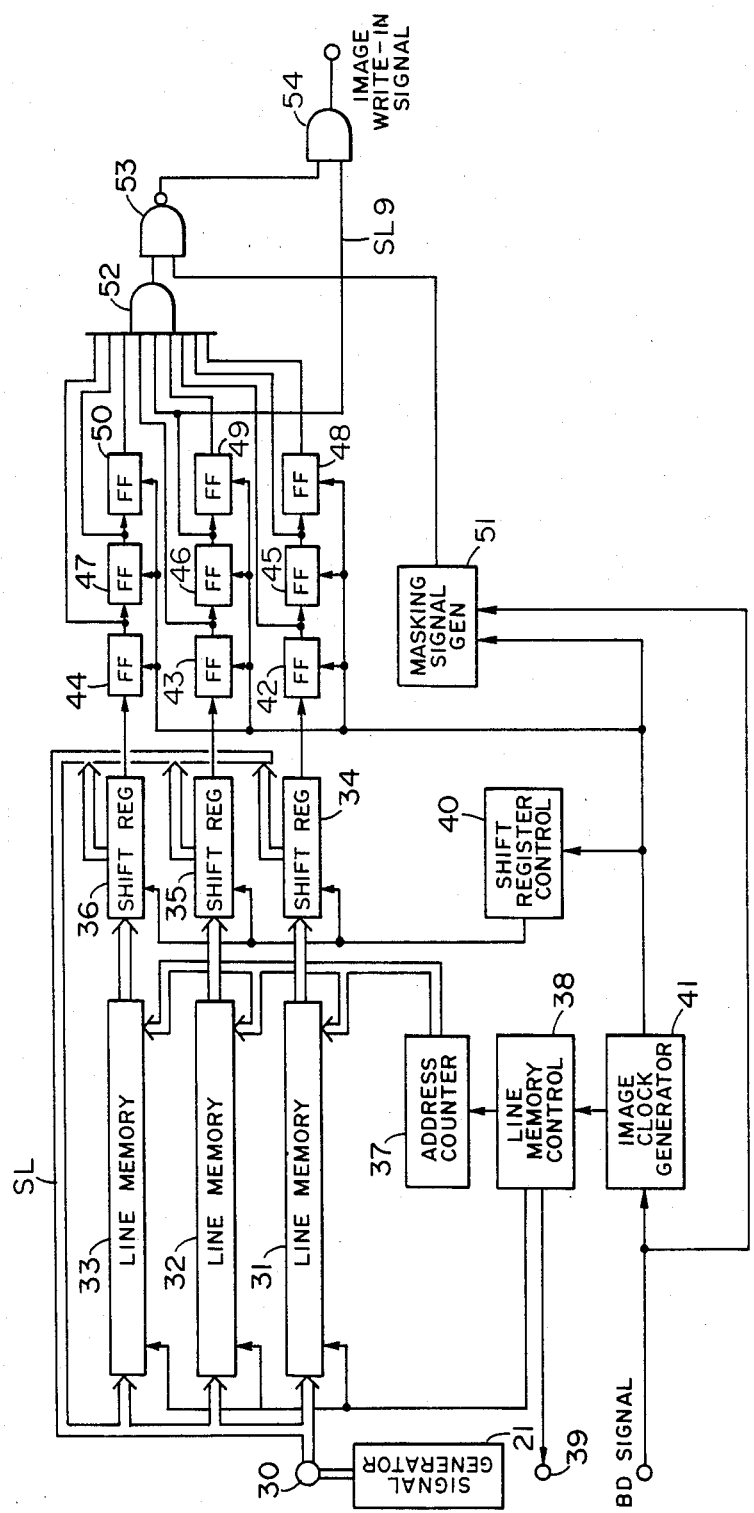
FIG. 11 is a schematic block diagram of the control circuitry for forming small regions in a recording field according to the present invention.

Now the control method in this embodiment will be discussed in relation to FIG. 11, wherein the same components as in FIG. 8 are represented by the same reference numerals.

The image signals supplied from the signal generator 21 associated with a beam scan line are received at a terminal 30 and stored in a line memory 31. The storage is conducted during a period t1 shown in FIG. 12C, in which the image recording by the laser beam is not conducted.

Figure 12:
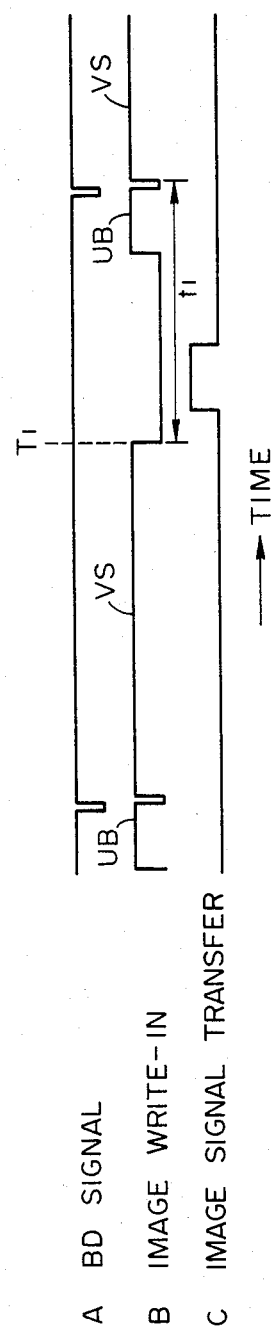
FIGS. 12, 13 and 14 show waveforms of various signals appearing in the control circuitry shown in FIG. 11.

Then the beam position detection signal BD is developed as shown in FIG. 12A at the start of each laser beam scanning across the photosensitive drum as already explained in the foregoing, and in synchronism with that signal the image write-in signals are supplied to the laser unit as shown in FIG. 12B.

In the image write-in signals the actual image signal segments VS exist only until a time T1, after which there is an empty period t1 until the succeeding detection signal BD containing no signals except the unblanking signal UB, and during the period effected is the parallel transmission of the image signals as shown in FIG. 12C from the signal generator 21 and the storage thereof in the line memory 31.

Figure 13:
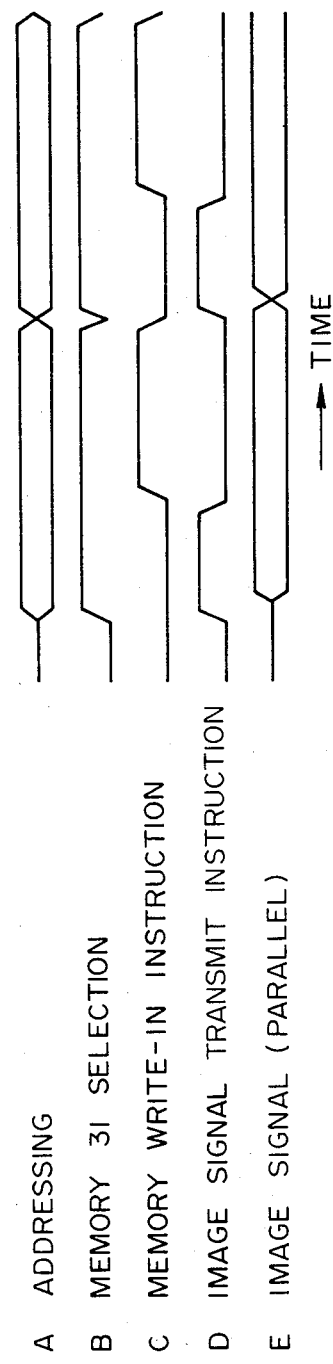

At the signal storage the address of the line memory 31 is set in response to an address signal (FIG. 13A) supplied from a line memory address counter 37, and a memory selection signal (FIG. 13B) is simultaneously generated. A line memory control 38 supplies a write-in instruction signal (FIG. 13C) to the line memory, and simultaneously supplies an image signal transmit instruction pulse (FIG. 13D) from a terminal 39 to the signal generator 21, whereby a block of parallel signals for example of n bits as shown in FIG. 13E is entered from signal generator 21 to the terminal 30 and stored in the line memory 31. Upon completion of the signal storage at an address location, the line memory control 38 produces a signal for incrementing the line memory addressing counter 37, and the above-explained procedure will be repeated. The signal storage into the line memory 31 is conducted in a shorter transmission time because of the parallel signal transmission, compared with the image signal period in which the same amount of image signals is transmitted in a serial manner, as shown in FIG. 12C, and is thus completed, for example in the case of 8-bit parallel transfer, within ⅛ of the time period required for serial signal transmission.

Figure 14:
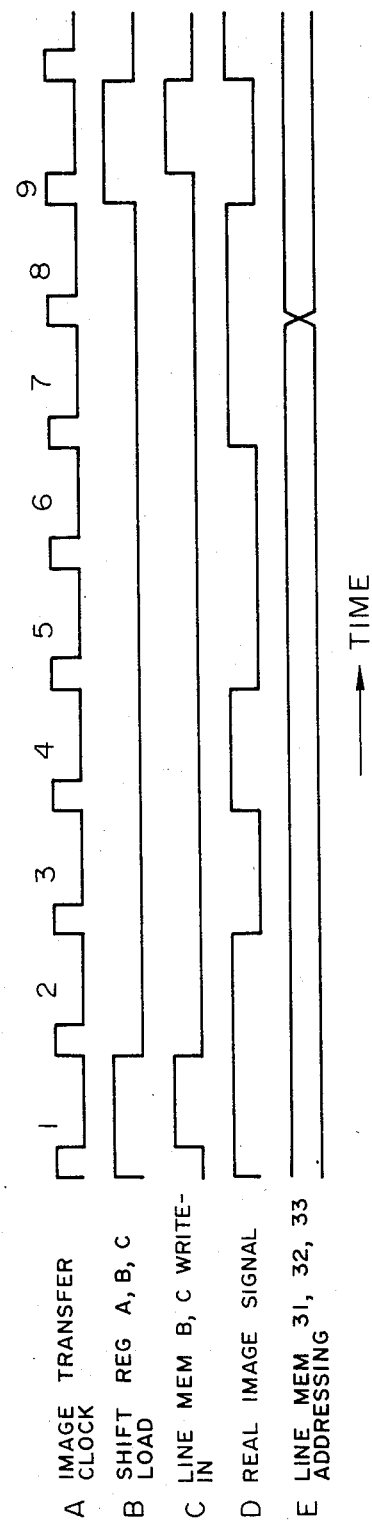

A single block of the image signals stored in the line memory 31 is loaded into a shift register 34 in response to the positive-going edge of a load pulse (FIG. 14B) supplied from a shift register control 40, and is shifted by image transfer clock pulses (FIG. 14A) supplied from an image clock pulse generator 41. The image signals thus loaded in the shift register 34 will be transferred, immediately after the loading, to a line memory 32 over a signal line SL and in synchronism with the memory write-in pulses shown in FIG. 14C. Addresses of the storage in the line memory 32 are designated by the line memory address counter 37 and is made in the same addresses as in the line memory 31. The address allocation of the line memories 31, 32 and 33 is conducted, as shown in FIG. 14E, prior to the loading of the shift registers 34, 35 and 36. The image signals loaded in the shift register 35 from the line memory 32 are transferred to the line memory 33 in the same manner as explained in the foregoing. The image signals loaded in the shift register 35 are shifted with the image transfer clock pulses shown in FIG. 14A to provide serial image signals as shown in FIG. 14D.

Stated differently, in response to the storage of a block of signals from the terminal 30 to the line memory 31 and the signal readout of a block of signals from line memory 31 to the shift register 34, the block of signals readout from the line memory 31 is stored in the line memory 32 and simultaneously a block of signals readout from the line memory 32 is stored in the line memory 33. Also the shift registers 35 and 36 respectively receive the signals readout from the line memories 32 and 33.

The image signals loaded in the shift registers 34, 35 and 36 are respectively transferred to flip-flops 42, 43 and 44 in synchronism with the image transfer clock pulses, then further transferred through flip-flops 45, 46 and 47 to flip-flops 48, 49 and 50 again in response to the clock pulses, and in response to such signal transfer new signals are supplied in succession from the shift registers 34–36 to the flip-flop 42–44.

Flip-flops 42–50 constitute three 3-bit shift registers, in which the flip-flops 42, 45 and 48 store the image signals of the line to be printed next, while the flip-flops 43, 46 and 49 store those of the line currently under printing, and the flip-flops 44, 47 and 50 store those of the preceding line already printed. The flip-flop 46 stores the signal of a pixel now printed and supplies an output signal over a signal line SL-9, while the flip-flops 43, 49 respectively store the signal of a pixel already printed before and the signal of a pixel to be printed next. In this manner the image signals of the pixel current under printed and the surrounding pixels are stored in the flip-flops 42–50, and it is therefore possible to identify whether the point currently under printing and the surrounding points are all black by checking, by means of an AND gate 52, if the output signals of the flip-flops are all in its high-level state. The region subjected to such identification can naturally be expanded by increasing the number of those line memories and flip-flops. In case said points are identified as entirely black, a masking signal from a masking signal generator 51 is supplied through a NAND gate 53 to an AND gate 54 to interrupt the serial image signals.

Figure 15:
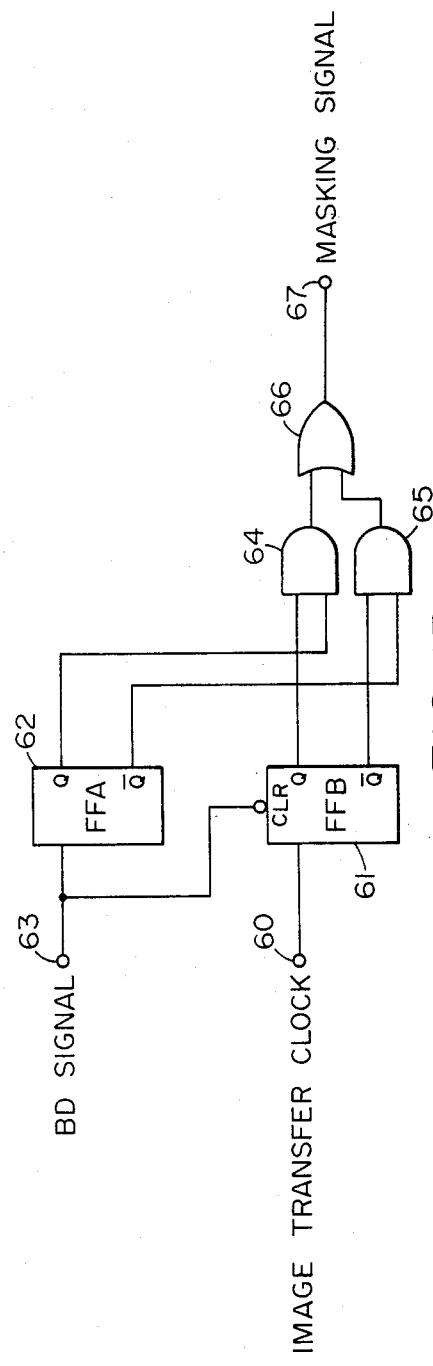
FIG. 15 is a schematic circuit diagram of the masking signal generating circuit.
Figure 16:
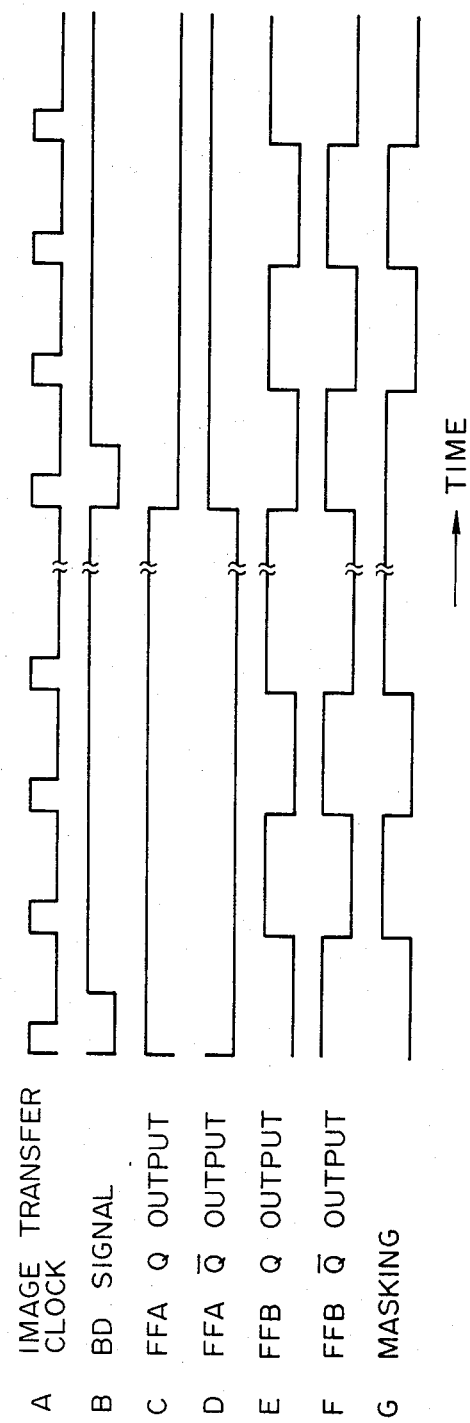
FIG. 16 depicts waveforms of various signals in the circuit shown in FIG. 15.

Masking signal generator 51 is shown in detail in FIG. 15, with an associated timing chart in FIG. 16. The image transfer clock pulses (FIG. 16A) synchronized with the aforementioned beam position detection signal BD shown in FIG. 16B are supplied from the aforementioned image clock generator 41 to a terminal 60 and are divided into half in frequency by a flip-flop 61, which produces in turn the signals shown in FIGS. 16E and 16F respectively from the output ports Q and $\bar{Q}$ thereof. As the flip-flop 61 is cleared by the beam detection signal BD developed at the start of each scanning line, the signals shown in FIGS. 16E and 16F always assume a determined phase at the start of each scanning line. The two signals have phases mutually inverted, and one of the two signals is selected as the masking signal for each other.

The selection is effected by a flip-flop 62 which divides the beam detection signal BD received at a terminal 63 into half in frequency, whereby the output signals from the ports Q and Q̄ thereof are inverted for each line as shown in FIG. 16C and 16D. AND gates 64, 65 are provided to transmit the aforementioned signals shown in FIGS. 16E and 16F respectively only when the signals shown in FIGS. 16C and 16D take their high state.

The output signals from the AND gates are supplied to an OR gate 66, which in fact receives the signal of FIG. 16E or of FIG. 16F since the signals shown in FIGS. 16C and 16D are mutually inverted, and which thus generates the masking signal shown in FIG. 16G through a terminal 67. The masking signal has a repeating period corresponding to two image transfer clock pulses or to two pixels and is inverted in phase line by line, whereby the serial image signals interrupted by such masking signal provide a staggered or checkerboard arrangement of white dots in a black image region. In this manner it is rendered possible to alleviate the density loss in a black image region by the edge effect.

Also the line image and the edge portions of large image region maintain a sharp and smooth image line since the masking is effected only when all the nine points, i.e. the point now in recording and the surrounding points, are identified as black and thus is not applied to the line images or the edge portions of large image regions.

Figure 17:
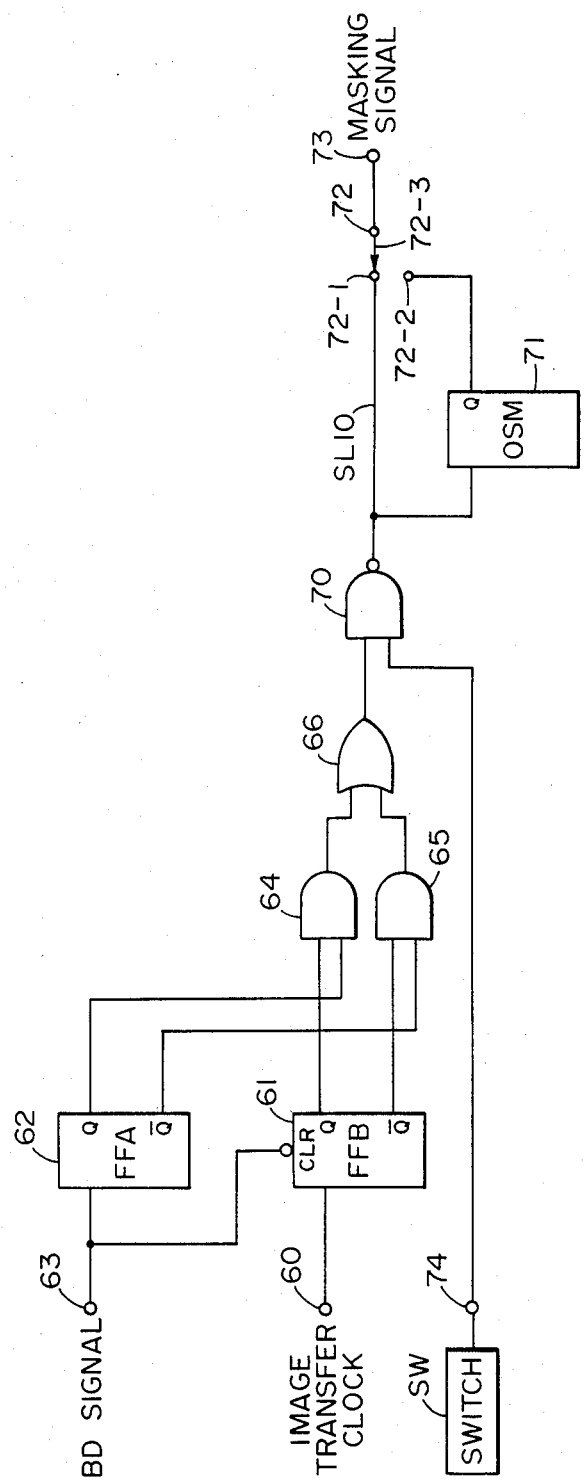
FIG. 17 is a schematic circuit diagram showing another embodiment of the masking signal generating circuit.

FIG. 17 shows another embodiment of the masking signal generator, which is featured by the presence of a one-shot multivibrator for varying the pulse duration of the masking signal and of a terminal 74 for instructing whether the masking operation is to be conducted or not.

Figure 18:
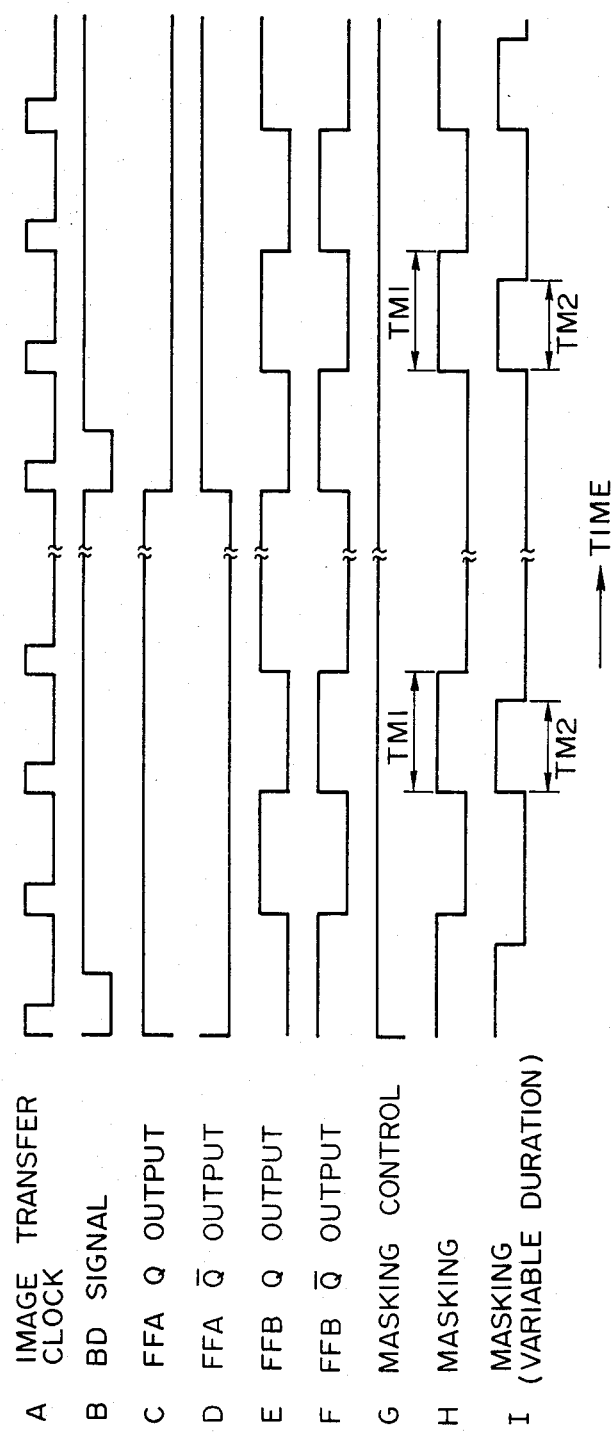
FIG. 18 depicts waveforms of various signals appearing in the circuit shown in FIG. 17.

In this embodiment the output signal of the OR gate 66 is supplied to an additional gate 70 which also receives a masking control signal as shown in FIG. 18G from a terminal 74, whereby the state of the masking control signal determines whether the masking signal is produced on the signal line SL-10 or not.

The masking signal on signal line SL-10 is supplied to a terminal 72-1 of a switch 72, and also to a one-shot multivibrator 71 of which output signal is supplied to the other terminal 72-2 of switch 72, whereby the masking signal obtained will assume such a form as shown in FIG. 18H when the contact arm 72-3 of switch 72 is in contact with the terminal 72-1 while it will assume a form as shown in FIG. 18I having a pulse duration TM2 determined by the time constant of the one-shot multivibrator when contact arm 72-3 is in contact with the terminal 72-2. Pulse duration TM2 is adjustable to a desired value by rendering the time constant variable.

What I claim is:

1. Electrostatic recording apparatus for forming small non-recording regions in a recording field comprising:

beam generating means for generating a beam modulated with a modulation signal;
   irradiating means for directing the beam obtained from said bean generating means to a photosensitive member for forming an electrostatic image;
   determining means for determining if the electrostatic image formed by said beam on said photosensitive member exceeds a determined dimension;
   interrupting means for interrupting intermittently emission of said beam at small time intervals; and
   actuating means for actuating said interrupting means when said determining means determines that said electrostatic image formed by said beam exceeds the determined dimension.

2. Electrostatic recording apparatus according to claim 1, wherein said determining means comprises memory means for storing a determined amount of recording signals, and detecting means for detecting whether all the recording signals stored in said memory means are in the same state.

3. Electrostatic recording apparatus according to claim 2, wherein said irradiating means comprises deflecting means for deflecting said beam generated by said beam generating means in order to scan said photosensitive member with said beam.

4. Electrostatic recording apparatus according to claim 1, further comprising inhibiting means for inhibiting actuation of said interrupting means when said determining means determines that said electrostatic image formed by said beam is smaller than a determined dimension.

5. Electrostatic recording apparatus for forming small non-recording regions in a recording field comprising:

beam generating means for generating a beam modulated with a modulation signal;
   irradiating means for directing the beam obtained from said beam generating means to a photosensitive member for forming an electrostatic image;
   determining means for determining if the electrostatic image formed by said beam on said photosensitive member meets a determined form;
   interrupting means for interrupting intermittently emission of said beam at small time intervals; and
   actuating means for actuating said interrupting means when said determining means determines that said electrostatic image formed by said beam meets the determined form.

6. Electrostatic recording apparatus according to claim 5, wherein said determination means comprises memory means for storing recording signals in a determined form, and detecting means for detecting whether all the recording signals stored in said memory means are in the same state.

7. Electrostatic recording apparatus according to claim 5, further comprising inhibiting means for inhibiting actuation of said interrupting means when said determining means determines that said electrostatic image formed by said beam does not meet the determined form.

8. Electrostatic recording apparatus for forming small non-recording regions in a recording field comprising:

beam generating means for generating a beam modulated with a modulation signal;
   irradiating means for directing the beam obtained from said beam generating means to a photosensitive member for forming an electrostatic image;
   determining means for determining if the image formed on said photosensitive member is an edge portion of an electrostatic image;
   interrupting means for interrupting intermittently emission of said beam at small time intervals; and
   actuating means for actuating said interrupting means when said determining means determines that the image formed by said beam is not an edge portion of the electrostatic image.

9. Electrostatic recording apparatus according to claim 8, wherein said determining means comprises memory means for storing recording signals of region neighboring to a region to be recorded, and detecting means for detecting whether all the recording signals stored in said memory means are signals to be recorded as a visible image.

10. Electrostatic recording apparatus according to claim 8, further comprising inhibiting means for inhibiting actuation of said interrupting means when said determining means determines that the image formed by said beam is an edge portion of the electrostatic image.

11. Electrostatic recording apparatus for forming small non-recording regions in a recording field comprising:

beam generating means for generating a beam modulated with a modulation signal;

a beam receiving member for receiving the beam obtained from said beam generating means to form a corresponding image;

deflecting means positioned between said beam generating means and said beam receiving member for deflecting said beam to scan said beam receiving member with said beam; and means for generating the modulation signal to form small recording regions at a predetermined repetition period in regions of the recording field except for the peripheral portions thereof during a deflection interval of said deflecting means and to from the small recording regions at the predetermined repetition period but at a different position in the regions of the recording field except for the peripheral portions thereof during another deflection interval of said deflecting means.

12. Electrostatic recording apparatus according to claim 11, further comprising:

beam detecting means for detecting arrival of said deflected beam at a determined position; and supply means for supplying a beam detecting signal from said beam detecting means to said modulation signal generating means.

13. Electrostatic recording apparatus according to claim 11, wherein said modulation signal forming means comprises:

signal generating means for generating two signals of the same frequency and of different phrases in synchronism with beam detection by said beam detecting means; and selecting means for alternately selecting the signals from said signal generating means in response to the beam detection by said beam detecting means.

14. Electrostatic recording apparatus for forming small non-recording regions in a recording field comprising:

beam generating means for generating a beam modulated with a modulation signal;

a beam receiving member for receiving the beam obtained from said beam generating means to form a corresponding image;

deflecting means positioned between said beam generating means and said beam receiving member for deflecting said beam to scan said beam receiving member with said beam;

memory means for storing first recording information involved in a scan line already scanned, second recording information involved in a scan line currently under recording and third recording information involved in a scan line to be scanned next;

means, responsive to the three informations stored in said memory means, for deciding whether the recording information is said memory means is to be recorded as it is; and interrupting means for periodically interrupting the beam generated by said beam generating means in response to output signals of said deciding means.

15. Electrostatic recording apparatus according to claim 14, further comprising shift means for shifting the first, second and third recording information stored in said memory means.

16. Electrostatic recording apparatus according to claim 14, wherein said memory means comprises first memory means for storing first recording information, second memory means for storing second recording information, third memory means for storing third recording information, first transfer means for transferring the content of said second memory means to said first memory means, and second transfer means for transferring the content of said third memory means to said second memory means.

17. Electrostatic recording apparatus for forming small non-recording regions in a recording field comprising:

beam generating means for generating a beam modulated with a modulation signal;

irradiating means for directing said beam obtained from said beam generating means to a photosensitive member for forming an electrostatic image;

means for producing a recording signal;

means for generating a masking signal to intermittently interrupt the recording signal;

means for generating the modulation signal by combining the recording signal with the masking signal; and selecting means for selecting whether or not to actuate said masking general generating means.

18. Electrostatic recording apparatus according to claim 17, wherein said selecting means comprises a switch.

19. Electrostatic recording apparatus according to claim 11, wherein said modulated signal generating means includes:

means for varying a dimension of said small recording regions.

20. Electrostatic recording apparatus according to claim 19, wherein said varying means comprises a one-shot multivibrator.

* * * * *

UNITED STATES PATENT AND TRADEMARK OFFICE
CERTIFICATE OF CORRECTION

PATENT NO. : 4,517,579

DATED : May 14, 1985

INVENTOR(S) : TAKASHI KITAMURA

It is certified that error appears in the above-identified patent and that said Letters Patent is hereby corrected as shown below:

Column 4, line 67, after "of" insert --lines--.

Column 12, line 37, change "meams" to --means--;

line 46, change "general" to --signal--.

Signed and Sealed this

Fifteenth Day of April 1986

[SEAL]

*Attest:*

DONALD J. QUIGG

*Attesting Officer*    *Commissioner of Patents and Trademarks*